350-96.25 SR CROSS REFERENCE SEARCH ROOM
XR 3,461,223

INVENTOR.
ROGER L. WILCOX
BY
Davis, Hoxie, Faithfull & Hapgood
ATTORNEYS

3461223

IMAGE TRANSLATION SYSTEM EMPLOYING OPTICAL FIBERS

Filed July 6, 1966 2 Sheets-Sheet 2

INVENTOR.
ROGER L. WILCOX
BY
Davis, Hoxie, Faithfull & Hapgood
ATTORNEYS.

United States Patent Office 3,461,223
Patented Aug. 12, 1969

3,461,223

IMAGE TRANSLATION SYSTEM EMPLOYING OPTICAL FIBERS

Roger L. Wilcox, Box 534, Amagansett, N.Y. 11930

Filed July 6, 1966, Ser. No. 563,197
Int. Cl. H04n *1/46, 9/00;* G02b *5/14*
U.S. Cl. 178—5.2 13 Claims

ABSTRACT OF THE DISCLOSURE

A color video transmission system includes an array of optical fibers at a transmitter and receiver, with the two arrays being characterized by inverse spatial transformations between image entrance and exit faces thereof. A plane of cyclically recurring primary color filters is connected to the exit face of the transmitter fiber array, and a corresponding plane of cyclically recurring primary color emitting phosphors is optically coupled to the entrance face of the receiver array. Electronic line scanning is employed to stimulate the phosphors in accordance with the image pattern present at the filter plane. An image is thereby produced at the exit plane of the receiver fiber array which closely corresponds to the image impinging upon the entrance face of the optical fibers at the transmitter.

This invention relates to image translation organizations and, more specifically, to an arrangement for electrically communicating video data, including color information, via a single electrical wave form.

In prior art black and white picture transmission organizations, e.g., television systems, an image is scanned by a single photosensitive transducer element, for example an image orthicon tube. The amplitude of a single electrical wave generated by the scanning device is modulated with the image intensity along sequential scanned lines, with the resulting waveform thus being a function of the combined luminescence of all spectral components distributed along the scanned lines.

To complete the picture transmission process, an electron beam in a receiving cathode ray tube is synchronized with the orientation of the pick-up tube element. The intensity of the cathode ray beam is regulated in accordance with the output wave generated by the image orthicon device, hence reproducing the original image in black and white form on the face of the cathode ray tube.

Correspondingly, in prior art color transmission systems, of which color television is illustrative, image scanning requires three separate pick-up photosensitive heads in a color pick-up camera, with the pick-up devices being adapted to respond only to the distribution of a corresponding primary color, viz., blue, red, or green in the scanned image. A corresponding set of three synchronized electron beams is included in a color receiving cathode ray tube to selectively energize corresponding primary color phosphors selectively distributed on the face of the color display tube.

Accordingly, prior art color transmission systems require extensive and complex additional circuitry vis-a-vis black and white systems to provide for the generation, modulation, transmission, demodulation, and display of the three distinct signals necessary to control the three image generating beams.

It is thus an object of the present invention to provide an improved video transmission system.

More specifically, an object of the present invention is the provision of a relatively simple video communication system which generates color displays.

It is another object of the present invention to provide a video television system which conveys image definition and color information via a single electrical waveform.

Still another object of the present invention is the provision of a color video transmission organization which employs a coded replica of the input image.

These and other objects of the present invention are realized in a specific illustrative color video transmission system which includes circuitry for transmitting a coded input image, and receiver circuitry for reconstituting the communicated image representation. The input image is focused on the input port, or entrance face of a coordinate coding array of optical fibers or fiber bundles. The exit face, or output port organization of the fiber array is transposed with respect to the input arrangement, with individual fibers or bundles being adapted to terminate on a particular primary color light filter.

A video pick-up tube, e.g., an image transducing device sequentially scans the light filters and generates a single output voltage signal which is utilized at an image reconstruction station to modulate a cathode ray tube beam in a conventional manner. This electron beam, in turn, is cyclically swept across an array of primary color light emitting phosphors.

The entrance face of a decoding coordinating array of optical fibers is selectively energized by the actuated phosphors. The exit face of the decoding fibers is rearranged in relation to the input port in a manner inverse to the coding array transposition. Accordingly, a reconstituted replica of the original image appears at this output port.

A complete understanding of the present invention may be gained from a consideration of the following detailed description of an illustrative embodiment thereof presented hereinbelow in conjunction with the accompanying drawing, in which.

Figures 4, 5:
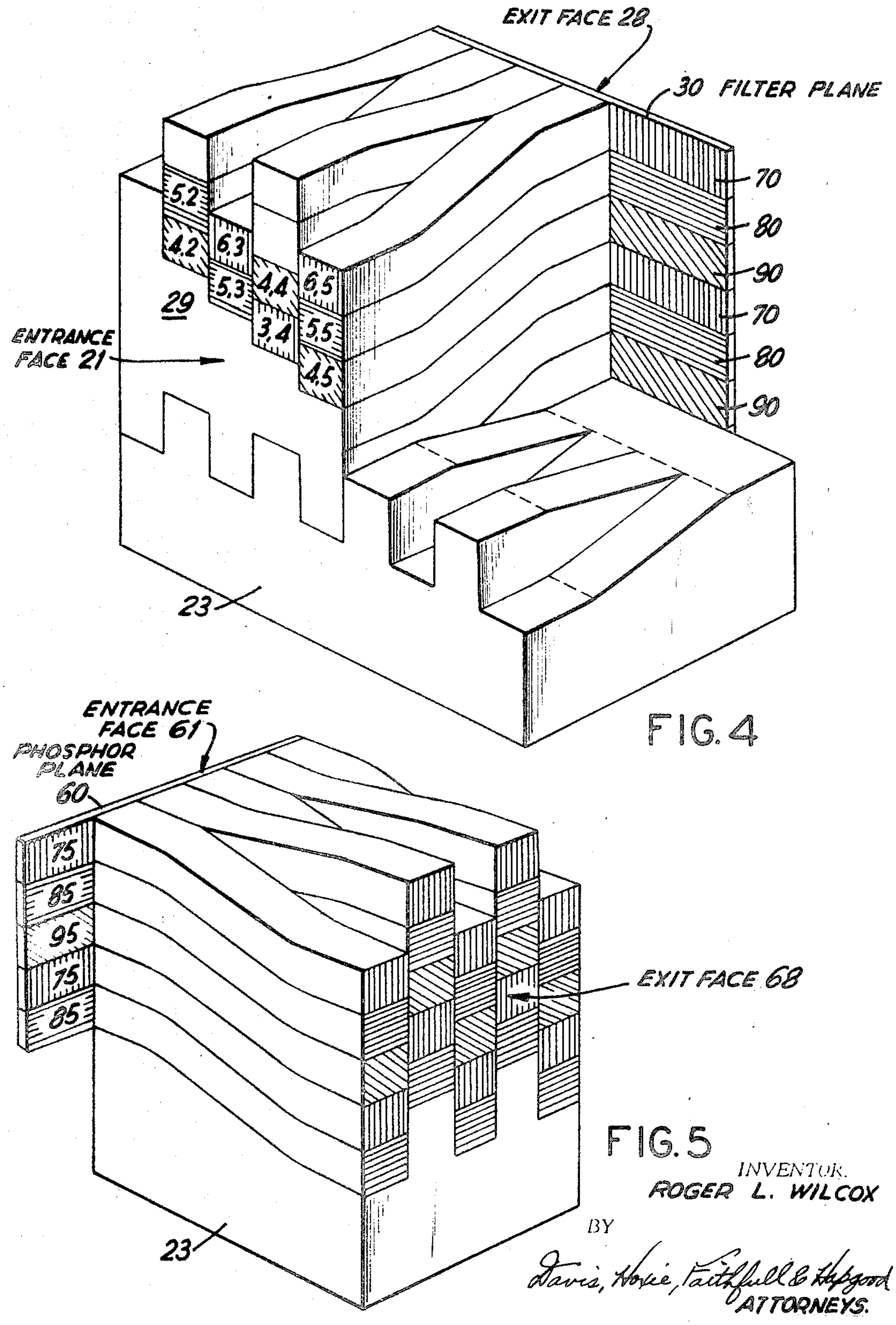

FIG. 4 is a partial isometrical representation of the array 20 and an attendant mounting device 23; and FIG. 5 comprises a partial isometrical representation of a decoding coordinate array 50 of optical fibers, along with an attendant mounting structure 23.

Throughout the drawing the same element, when shown in more than one figure, is identified by a like reference numeral.

Figure 1:
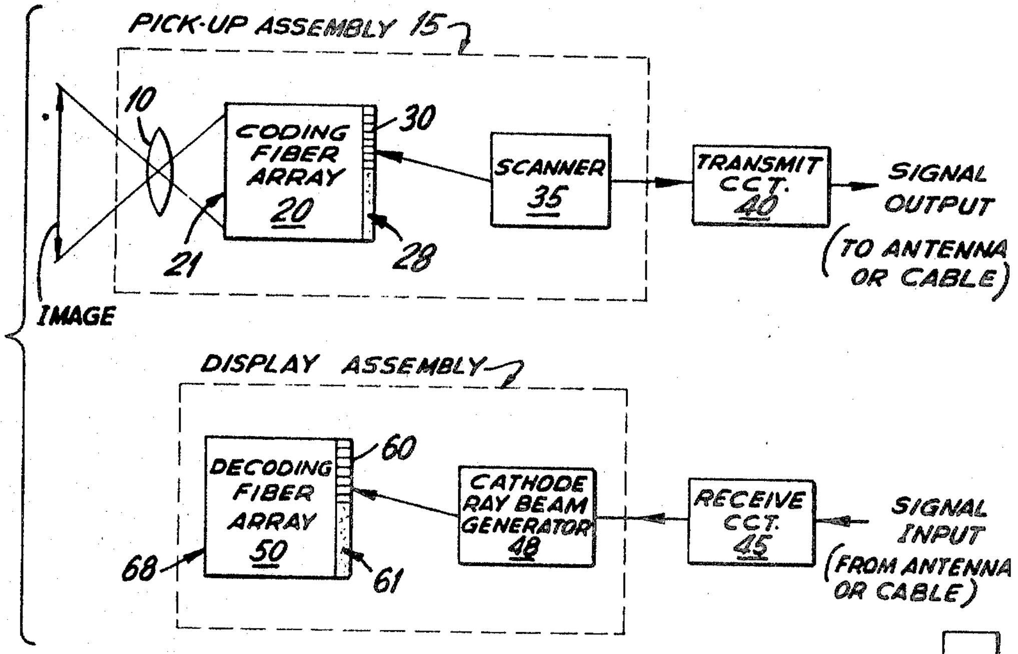
FIG. 1 is a diagram illustrating a composite video communication organization which illustrates the principles of the present invention.

Referring now to FIG. 1, there is shown in overall scope a color video transmission system which embodies the principles of the present invention. The transmitting portion of FIG. 1 includes a pick-up assembly 15 which, in turn, includes a lens 10 for focusing an image of interest on the entrance face (input port) 21 of a coded array 20 of optical fibers. Optical fiber elements are well known in the art and described, for example, in H. B. Cole Patent No. 2,939,362, issued June 7, 1960 and T. Trott Patent No. 3,210,462, issued Oct. 5, 1965. Briefly, such fibers are relatively small diameter structures of arbitrary cross-sectional geometry which transmit incident light therethrough along the long dimension of the fiber, independent of any bends or curvature thereof.

Structurally, the fibers preferably comprise a high refractive index glass core clad in a low refractive index glass coating. A plurality of said clad fibers may be drawn together in a second low refractive index glass sheath to form multifiber bundles of any appropriate cross-sectional geometry. Such bundles may be utilized as light transmitting units or elements in the arrays of FIG. 1.

A filter plane 30 is disposed adjacent to the exit face (output port) of the array 20, and comprises a plurality of stacked, cyclicly reoccurring horizontal primary color light filters, i.e., filters which respectively pass red, blue, and green spectral components. There is a coded transformation between the relative positioning of the fibers at the two ports of the array 20 such that at least one fiber in each local area of the entrance face 21 terminates at each of a red, blue, and green filter of the plane 30.

A scanner 35 is adapted to continuously scan horizontally across the filter strips in the plane 30 in an order conventional with video scanners. Subsequently, the voltage waveform generated by the scanner 35 is employed by a transmitting circuit 40 to modulate a carrier, e.g., of a television frequency, or to otherwise transmit said waveform. In addition, the circuit 40 impresses synchronizing signals on the carrier (where used) and supplies the resulting complex wave to an antennae or cable system for purposes of electromagnetic transmission. It is noted that the elements 35 and 40, as well as other circuit arrangements described hereinafter, may comprise standard circuit configurations employed in present day television systems.

The broadcast wave is detected and demodulated at a receiving station by a receiving circuit 45, such a circuit being found in standard television receiving sets. The demodulated signal, along with the attendant synchronizing information, is utilized to energize a cathode ray beam generator 48 which may comprise any cathode ray gun well known in the art. In particular, the electron beam produced by the element 48 is synchronized with the scanner 35, and is modulated in intensity by a replica of the signal produced by the device 35.

The cathode ray beam is cyclicly swept horizontally across a stacked array of primary color emitting phosphor sheets which are included in a phosphor plane 60. The sheets in the plane 60 are arranged in one-to-one geometrical correspondence with the filter sheets in the plane 30 such that the light pattern generated by the beam-irradiated phosphors is essentially identical to that supplied to the filter plane 30 by the coding fiber array 20.

The decoding coordinate array 50 of light conducting fibers has an entrance face 61 optically coupled to the output of the phosphor plane 60, and an array 50 exit face 68 is accessible to a viewer, for example through a clear glass facing of an evacuated tube (not shown). Also the decoding array 50 is characterized by a transformation between the fiber arrangement at the entrance and exit faces 61 and 68 thereof which is exactly the inverse of the coding array 20. Therefore, since the disjointed representations of the input image present at the input side of the filter plane 30 and at the output side of the phosphor plane 60 are identical, and since the coding and decoding arrays 20 and 50 are characterized by inversion transformations, the reconstituted output image at the exit face 68 will identically correspond in definition and color to the focused input image defined on the entrance face 21.

Figure 2:
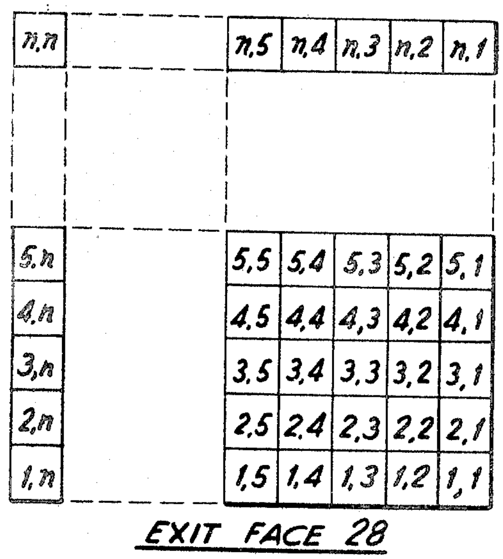
FIG. 2 illustrates the exit face of a coding coordinate array 20 of optical fibers shown in FIG. 1.

Turning now to FIG. 2, there is shown the spatial organization of the optical fibers at the exit face 28 of the coding array 20. Each fiber is identified in the drawing by two cartesian coordinates with the designation 3, 2, for example, identifying the fiber in the third row and the second column of the array 20, wherein the rows are measured upwards and the columns are measured from right to left at the face 28.

Each fiber in an exit face 28 row terminates on a like primary color filter strip included in the plane 30 (see FIG. 4), with these filters reoccurring in the primary color sequence, red, blue, green, red, blue, etc.

Figure 3:
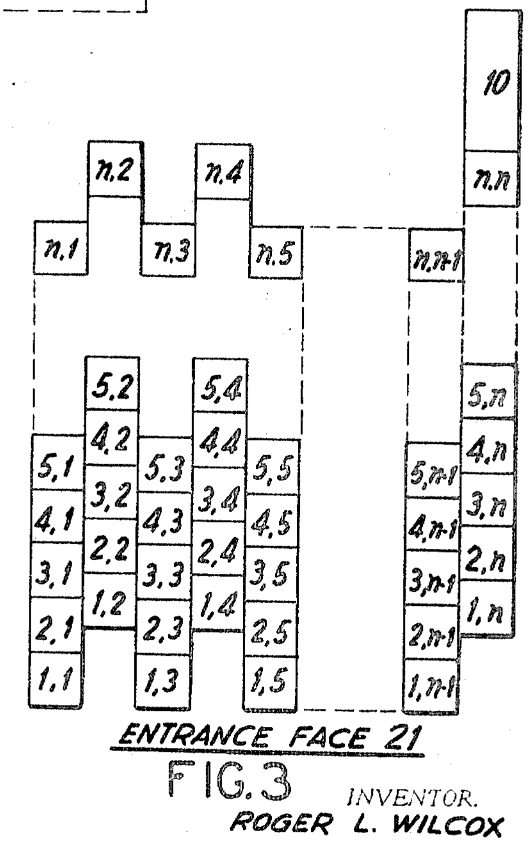
FIG. 3 is a diagram of the entrance face of the coding coordinate array 20 of optical fibers.

The organization of the entrance face 21 of the coding array 20 is shown in FIG. 3 and comprises a transposition in relation to the exit face 28 wherein all of the fibers in odd numbered columns are lower by ¾ (.75) of the fiber vertical dimension, and all even numbered columns are raised by ¾ (.75) of the fiber dimension, thereby causing a relative dislocation of 1½ fiber units between adjacent columns.

A plurality of optical fibers included in the coding array 20 and a base member 23 for containing the fibers and for producing the desired fiber encoding is shown isometrically in FIG. 4, with the blank area 29 comprising a subgroup of fibers not shown in detail therein for purposes of clarity. It is observed from FIG. 4 that the light pattern corresponding to an input image focused on the entrance face 21 of the array 20 is transmitted in discrete units via the fibers to the exit face 28, wherein the transformed image pattern would be visually incomprehensible yet would contain all of the elements of the focused image. Also, the fiber rows at the exit face 28 of the array 20 are shown in FIG. 4 as terminating on either a red, blue, or green filter strip 70, 80, or 90, which strips are respectively differentiated in the drawing by varying sloped shadings.

Thus, it may be seen that the coding array 20, together with the filter plane 30, effectively functions as a color component separating organization, wherein the color separation is functionally uniform across the entrance face 21. Moreover, each localized area of the input port 21 of the array 20 includes at least one optical fiber which is adapted in combination with an association filter 70 80, or 90 to communicate the incidence of one particular primary color of the image to the scanner 35. Typical combinations of three primary component fibers are 4,4 green, 6,5 red, 5,5 blue; interlocking with 4,4 green, 3,4 red, 5,5 blue; or 5,2 blue, 4,2 green, 6,3 red; interlocking with 4,2 green, 6,3 red and 5,3 blue.

The red, blue, and green components of such clusters are translated to, and respectively included in red, blue, and green scan lines when the scanner 35 sweeps across output of the corresponding red, blue and green filters included in the plane 30. Accordingly, the single electrical waveform generated by the scanner 35 and impressed on the carrier by the transmit circuit 40 during each scan line represents a single color component, and the identity of the color is preserved by synchronizing information also impressed on the carrier. Further, scanning of a complete image frame therefore converts the composite input color image into a single modulated wave for transmission to and reception by conventional black and white single-beam television sets such as partially represented by the circuit 45. When the receiving embodiments include a decoding fiber array 50 of the type described in detail hereinbelow, reconstitution of the transmitted image in color may be effected, as generally set forth herein.

Referring now to FIG. 5, there is isometrically shown a decoding fiber array 50 which is identical to the coding array 20 shown in FIG. 4 except that the entrance and exit faces are reversed. Thus, the video transformation effected by the array 50 is the inverse of that produced by the coding array 20.

A stacked array of reoccurring red, blue, and green emitting phosphor strips 75, 85, and 95 are disposed optically facing the input ends of corresponding rows of optical fibers at the entrance face 61 of the array 50. When the scanner 35 is examining a particular filter strip, e.g., a red one 70, the synchronized cathode ray beam produced by the generator 48 is energizing a corresponding red phosphor strip 75 in the plane 60. Hence, the resulting red image components observed at the output port 68 of the activated fiber array 50 are identical to the red components present in the scanned input image.

In general, the scanner 35 and the phosphor stimulating cathode ray beam synchronized therewith reproduce the entire input image at the exit face 68 of the decoding array 50 with full definition and color reconstitution being effected. Thus, it may be understood that any color image focused upon an otherwise conventional black and white television camera may be transmitted by conventional black and white television transmitters to conventional black and white receivers where it will be displayed as a color image when the image coding and decoding optical fiber arrays 20 and 50 are appropriately installed in the system.

It is observed at this point that apart from and in addition to the obvious advantages embodied by the present invention, improved rendition of television pictures results from the effective subdivision of the pattern of scan lines otherwise observable to viewers in conventional television transmission. This effect obtains by virtue of the nonlinear distribution of color image resolving units in the camera focal plane and corresponding viewer surface, i.e., the inclusion of adjacent image color points in different scan lines.

It is also noted that the invention in its broader aspects relates to a self-contained solid state image processing system which is not limited to color separation functions, but which may also function as an image coding device and as associated image decoding device in all applications involving images.

Further, since linear to nonlinear pattern transformations are effected in the present invention, it is further contemplated that synthetic images comprising bits or modules of information may be processed. Accordingly, the invention is useful as a component in optical computer circuits.

It is to be understood that the above described arrangement is only illustrative of the application of the principles of the present invention. Numerous other arrangements may be devised by those skilled in the art without departing from the spirit and scope of the invention. For example, appropriate color filter fibers may be utilized in an alternative form of the invention in the coding and decoding arrays 20 and 50. In such an organization, the filter and phosphor planes 30 and 60 may be deleted, their function being directly effected by the associated filter fiber array, a conventional white phosphor blend being used in place of the plane 60.

In addition, the arrangement described above may be utilized to reproduce color pictorial data in any media form, such as facsimile or the like, and is not limited to television transmission.

I claim:

1. In combination, an array of optical fibers including an entrance face and an exit face, said array being characterized by a spatial transformation between the fiber arrangements at said entrance and exit faces thereof, a plurality of optical filters for passing different color spectral light components, and means for constantly optically coupling the end of each fiber at said exit face in a fixed relationship to a selected one of said optical filters.

2. A combination as in claim 1, wherein said filter plurality comprises a cyclic array of primary color filter sheets.

3. A combination as in claim 1, wherein said fiber array exit face is characterized by a regular array of fiber rows and columns, and wherein adjacent columns are dislocated at said entrance face.

4. In combination, an array of optical fibers including an entrance and an exit face, the individual fibers of said array being characterized by a spatial transformation between said entrance and exit faces, a plurality of light emitting phosphor means in a cyclic array, and means for constantly optically coupling the end of each fiber at said entrance face in a fixed relationship to a selected one of said phosphor means.

5. A combination as in claim 4, wherein said plurality of phosphor means comprises primary color emitting sheets.

6. A combination as claimed in claim 5, wherein said fiber array entrance face is characterized by a regular array of fiber rows and columns, and wherein adjacent columns are dislocated at said exit face.

7. In combination, a first array of optical fibers including entrance and exit faces, color filter means optically coupled to said first array exit face in a fixed, continuous manner for selectively passing different color spectral components therethrough at corresponding spatial areas thereof, means for sequentially scanning the output from said selective color spectral passing means, a second array of optical fibers including entrance and exit faces, means optically coupled to said entrance face of said second array in a fixed, constant manner for selectively illuminating different areas of said entrance face with different spectral color components, and means operable in synchronization with said scanning means for actuating said selective illuminating means.

8. A combination as in claim 7 wherein the optical fibers included in said first and second arrays are characterized by inverse transformations between the entrance and exit faces thereof.

9. A combination as in claim 8, wherein said selective light passing means comprises a plurality of cyclic primary color filter strips.

10. The combination of claim 9, wherein said illuminating means comprises a plurality of energizable primary color emitting phosphor strips in one-to-one correspondence with said filter strips.

11. A combination as in claim 1 wherein each of said filters is characterized by a long dimensional axis, and further comprising means for sequentially scanning along the long dimension of each of said filter axes.

12. A combination as in claim 4 wherein each of said light emitting phosphor means is characterized by a long dimensional axis, and further comprising means for sequentially traversing a phosphor stimulating scanning beam along the long axis of each of said phosphor means.

13. A combination as in claim 10 wherein each of said filter strips and said phosphor strips is characterized by a long dimensioinal axis, and wherein said scanning means includes means for sequentially scanning across the long dimension of each filter strip, and wherein said illumination actuating means includes means for sequentially traversing phosphor stimulating means across the long axis of said phosphor strips.

References Cited

UNITED STATES PATENTS

| | | | |
|---|---|---|---|
| 2,899,489 | 8/1959 | Cheetham et al. | 178—5.4 |
| 2,967,248 | 1/1961 | Nicoll | 250—213 |
| 3,036,153 | 5/1962 | Day | 178—7.1 |
| 3,043,179 | 6/1962 | Dunn | 88—1 |
| 3,130,263 | 4/1964 | Manning | 178—5.4 |
| 3,184,872 | 5/1965 | Way | 40—106.53 |
| 3,267,209 | 8/1966 | Nagamori | 178—5.4 |

RICHARD MURRAY, Primary Examiner

JOHN MARTIN, Assistant Examiner

U.S. Cl. X.R.

350—96